2,940,843
ROCKET PROPELLANT FUEL

E. Milton Wilson, Pasadena, and Allen F. Graefe, Monrovia, Calif., assignors to Aerojet-General Corporation, Azusa, Calif., a corporation of Ohio No Drawing. Filed Mar. 16, 1954, Ser. No. 416,684

3 Claims. (Cl. 52—.5)

This invention relates to new propellant compositions. In particular, it relates to mixtures of N,N-dimethylhydrazine and lower oxoalkane-N,N-dimethylhydrazones.

Due to its high energy content, N,N-dimethylhydrazine has found considerable use as a fuel for both rocket motors and gas generators. However, its freezing point, even though $-71°$ F., is still not sufficiently low to permit its use under extreme conditions commonly found in arctic regions or high altitudes.

We have now found that mixtures of N,N-dimethylhydrazine and lower oxoalkane-N,N-dimethylhydrazones, exhibit propellant properties similar to N,N-dimethylhydrazine and freezing points sufficiently low to permit their use as fuels at temperatures at least as low as $-150°$ F.

Due to its low molecular weight, we prefer to employ formaldehyde-N,N-dimethylhydrazone, the energy content, specific impulse, and hypergolicity of which are substantially the same as for N,N-dimethylhydrazine itself. The freezing point of mixtures containing various amounts of formaldehyde-N,N-dimethylhydrazone in N,N-dimethylhydrazine are shown in Table I.

Table I

| Wt. Percent $(CH_3)_2$—NN=$CH_2$ in $(CH_3)_2$—NNH$_2$ | Freezing Point, °F. |
|---|---|
| 11.2 | -81 |
| 32.3 | -95 |
| 54.1 | -135 |
| 60.7 | -153 |

Similar results were obtained from mixtures of N,N-dimethylhydrazine, acetaldehyde-N,N-dimethylhydrazone, propionaldehyde-N,N-dimethylhydrazone and acetone-N,N-dimethylhydrazone.

Oxoalkane-N,N-dimethylhydrazones are commonly prepared by condensing aldehydes or ketones with N,N-dimethylhydrazine in accordance with the general reaction scheme set forth below:

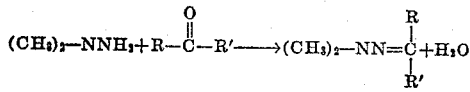

wherein R and R′ are hydrogen or alkyl radicals.

The mixtures of this invention are conveniently prepared by merely adding an oxoalkane, in less than stoichiometric proportions, to N,N-dimethylhydrazine. The oxoalkane condenses with part of the hydrazine producing a hydrazine-hydrazone mixture which is then salted out of the aqueous solution and distilled.

The preferred fuels of this invention are composed of from about 1% to about 61% by weight hydrazone and from about 39% to about 99% by weight of dimethylhydrazine.

We have succeeded in inventing fuels which have the energy content, specific impulse and hypergolicity of N,N-dimethylhydrazine, and also exhibit substantially lower freezing points. It is apparent that these fuels will find valuable use in low temperature propulsion.

We claim:

1. A novel propellant composition consisting essentially of a mixture of from about 1% to about 61% by weight of a lower oxoalkane-N,N-dimethylhydrazone and from about 39% to about 99% by weight of the total composition of N,N-dimethylhydrazine.

2. A novel propellant composition consisting essentially of a mixture of from about 1% to about 61% by weight of an alkanal-N,N-dimethylhydrazone and from about 39% to about 99% by weight of the total composition of N,N-dimethylhydrazine.

3. A novel propellant composition consisting essentially of a mixture of formaldehyde-N,N-dimethylhydrazone in an amount of from about 1% to about 61% by weight of the total composition, and N,N-dimethylhydrazine in an amount of from about 39% to about 99% by weight of the total composition.

References Cited in the file of this patent

UNITED STATES PATENTS

| | | |
|---|---|---|
| 2,161,808 | Finlayson et al. | June 13, 1939 |
| 2,521,026 | Solomon | Sept. 5, 1950 |

OTHER REFERENCES

Byrkit et al.: "Hydrazine in Organic Chemistry," Industrial and Engineering Chem., vol. 42, pages 1862–1875, September 1950.

Mellor: "Modern Inorganic Chemistry," Longmans, Green & Co., New York, 1939 edition, page 182.

Todd: "J. Am. Chem. Soc.," vol. 71, April 1949, pages 1353–8.